United States Patent
Khan

(10) Patent No.: US 10,440,711 B2
(45) Date of Patent: Oct. 8, 2019

(54) ASSIGNMENT OF DOWNLINK AND UPLINK FREQUENCY CHANNELS IN WIDELY-SPACED DOWNLINK AND UPLINK CHANNELS

(71) Applicant: Phazr, Inc., Allen, TX (US)

(72) Inventor: Farooq Khan, Allen, TX (US)

(73) Assignee: Phazr, Inc., Allen, TX (US)

( * ) Notice: Subject to any disclaimer, the term of this patent is extended or adjusted under 35 U.S.C. 154(b) by 82 days.

(21) Appl. No.: 15/583,657

(22) Filed: May 1, 2017

(65) Prior Publication Data

US 2018/0317219 A1    Nov. 1, 2018

(51) Int. Cl.
*H04W 72/04* (2009.01)
*H04L 5/00* (2006.01)

(52) U.S. Cl.
CPC ....... *H04W 72/0453* (2013.01); *H04L 5/0044* (2013.01); *H04L 5/0053* (2013.01); *H04L 5/0092* (2013.01); *H04W 72/042* (2013.01); *H04W 72/0413* (2013.01)

(58) Field of Classification Search
CPC ........... H04W 72/0453; H04W 72/042; H04W 72/0413; H04L 25/00; H04L 5/00; H04L 5/0053; H04L 5/0044; H04L 5/0092
See application file for complete search history.

(56) References Cited

U.S. PATENT DOCUMENTS

| | | | | |
|---|---|---|---|---|
| 5,940,769 A | * | 8/1999 | Nakajima | H04L 1/1887 370/216 |
| 2013/0077551 A1 | * | 3/2013 | Lo | H04W 16/14 370/312 |
| 2013/0155883 A1 | * | 6/2013 | Bhattacharjee | H04W 48/16 370/252 |
| 2016/0254855 A1 | * | 9/2016 | Tong | H04B 7/18513 370/316 |
| 2017/0289960 A1 | * | 10/2017 | Moustafa | H04L 5/14 |
| 2018/0235025 A1 | * | 8/2018 | Chen | H04L 5/0064 |
| 2018/0316481 A1 | * | 11/2018 | Montojo | H04L 5/003 |

* cited by examiner

*Primary Examiner* — Kwang B Yao
*Assistant Examiner* — Moo Jeong
(74) *Attorney, Agent, or Firm* — Michael A. Rahman

(57) ABSTRACT

A method of downlink and uplink frequency channel assignments in widely-spaced downlink and uplink frequency channels includes determining a downlink block length by dividing a millimeter wave spectrum into a plurality of downlink spectrum blocks and determining an uplink block length by dividing a sub-6 GHz spectrum into a plurality of uplink spectrum blocks. The method includes dividing the downlink block length into a plurality of downlink channels and dividing the uplink block length into a plurality of uplink channels. The method includes determining a starting local oscillator frequency from center frequencies of the first uplink and downlink channels and uplink and downlink channel bandwidths. The method includes determining a plurality of uplink and downlink communications channel pairs based on a frequency mapping relationship based on the starting local oscillator frequency. The method includes assigning a first uplink and downlink communications channel pair to a user.

21 Claims, 12 Drawing Sheets

ASSIGNMENT OF DOWNLINK AND UPLINK FREQUENCY CHANNELS IN WIDELY-SPACED DOWNLINK AND UPLINK CHANNELS

BACKGROUND

The invention relates to wireless communications, and in particular to assignment of downlink and uplink frequency channels in a wireless communications system relying on widely-spaced downlink and uplink frequency channels.

DESCRIPTION OF THE RELATED ART

Currently, wireless access methods are based on two popular standards: a wide area network (WAN) standard referred to as The Fourth Generation Long Term Evolution (4G LTE) system; and a local area network (LAN) standard called Wi-Fi. Wi-Fi is generally used indoors as a short-range wireless extension of wired broadband systems. The 4G LTE systems on the other hand provide wide area long-range connectivity both outdoors and indoors using dedicated infrastructure such as cell towers and backhaul to connect to the Internet.

As more people connect to the Internet, increasingly chat with friends and family, watch videos, listen to streamed music, and indulge in virtual or augmented reality, data traffic continues to grow at unprecedented rates. In order to address the continuously growing wireless capacity challenge, the next generation of LAN and WAN systems are expected to rely on higher frequencies referred to as millimeter waves in addition to currently used frequency bands below 6 GHz.

BRIEF SUMMARY OF THE INVENTION

Various disclosed embodiments are directed to wireless communications, and in particular wireless communications using millimeter wave spectrum such as 28, 37 or 39 GHz bands in the downlink and sub-6 GHz spectrum in the uplink. In one aspect, disclosed embodiments are directed to frequency channel assignments between the millimeter wave spectrum such as 28, 37 or 39 GHz bands in the downlink and below 6 GHz spectrum in the uplink. The frequency channel assignments maximize utilization of the millimeter wave spectrum in the downlink and below 6 GHz spectrum in the uplink.

According to disclosed embodiments, a method of determining a starting local oscillator frequency for downlink and uplink frequency channel assignments in a wireless communications system utilizing widely-spaced downlink and uplink frequency channels includes determining a downlink block length by dividing a millimeter wave spectrum into a plurality of downlink spectrum blocks and determining an uplink block length by dividing a sub-6 GHz spectrum into a plurality of uplink spectrum blocks.

The method includes dividing the downlink block length into a plurality of downlink channels having a downlink channel bandwidth and dividing the uplink block length into a plurality of uplink channels having an uplink channel bandwidth. The method includes determining center frequencies of the first uplink and downlink channels. The method includes determining a starting local oscillator frequency from the center frequencies of the first uplink and downlink channels and the uplink and downlink channel bandwidths.

According to disclosed embodiments, a method of channel assignments in a wireless communications system utilizing widely-spaced downlink and uplink frequency channels includes determining uplink and downlink spectrum block lengths. The method includes determining uplink and downlink channel bandwidths, wherein there are m uplink channels in the uplink spectrum block length and n downlink channels in the downlink spectrum block length, m and n being integers. The method includes determining a starting local oscillator frequency from center frequencies of first uplink and downlink channels and uplink and downlink channel bandwidths. The method includes determining a plurality of uplink and downlink communications channel pairs based on a frequency mapping relationship based on the starting local oscillator frequency. The method includes assigning a first uplink and downlink communications channel pair to a user. The downlink channel is in a millimeter wave band and the uplink channel is in a sub-6 GHz channel;

The method includes determining if all millimeter wave channels have been used. If all millimeter wave channels have not been used, assigning a second uplink and downlink communications channel pair to a user. If all millimeter wave channels have been used, determining if all sub-6 GHz channels have been used. The method includes updating the local oscillator frequency if all sub-6 GHz channels have been used. The method includes determining a plurality of uplink and downlink communications channel pairs based on the frequency mapping relationship based on the updated starting local oscillator frequency.

The method includes determining if all sub-6 GHz channels have been used. If all sub-6 GHz channels have not been used, assigning a second uplink and downlink communications channel pair to a user. If all sub-6 GHz channels have been used, determining if all millimeter wave channels have been used. The method includes updating the local oscillator frequency if all 6 GHz channels have been used. The method includes determining a plurality of uplink and downlink communications channel pairs based on the frequency mapping relationship based on the updated starting local oscillator frequency.

DETAILED DESCRIPTION AND BEST MODE OF IMPLEMENTATION

Various disclosed embodiments are directed to methods and systems for assignment of widely-spaced downlink and uplink frequency channels in a wireless communications system that relies on variable length downlink and uplink spectrum blocks. In one aspect of the invention, a frequency channel of either the downlink millimeter wave spectrum or the uplink sub-6 GHz spectrum having the smaller block length is shared by multiple users while a frequency channel in the bigger block length is not shared. Thus, if the spectrum block length of the downlink millimeter wave spectrum is smaller than the spectrum block length of the uplink sub-6 GHz spectrum, a frequency channel in the downlink millimeter wave spectrum is shared by multiple users while a frequency channel in the uplink sub-6 GHz spectrum is not shared by multiple users. Similarly, if the spectrum block length of the downlink millimeter wave spectrum is larger than the spectrum block length of the uplink sub-6 GHz spectrum, a frequency channel in the uplink sub-6 GHz spectrum is shared by multiple users while a frequency channel in the downlink millimeter wave spectrum is not shared by multiple users.

Table 1 below lists examples of millimeter wave bands.

TABLE 1

Examples of millimeter wave bands

| Bands [GHz] | Frequency [GHz] | Bandwidth [GHz] |
| --- | --- | --- |
| 24 GHz | 24.25-24.45 | 0.200 |
|  | 24.75-25.25 | 0.500 |
| 28 GHz/ LMDS | 27.5-28.35 | 0.850 |
|  | 29.1-29.25 | 0.150 |
|  | 31-31.3 | 0.300 |
| 32 GHz | 31.8-33.4 | 1.600 |
| 37 GHz | 37.0-38.6 | 1.600 |
| 39 GHz | 38.6-40 | 1.400 |
| 42 GHz | 42.0-42.5 | 0.500 |
| 47 GHz | 47.2-50.2 | 3.000 |
| 50 GHz | 50.4-52.6 | 1.200 |
| 60 GHz | 57-64 | 7.000 |
|  | 64-71 | 7.000 |
| 70/80 GHz | 71-76 | 5.000 |
|  | 81-86 | 5.000 |
| 90 GHz | 92-94 | 2.900 |
|  | 94.1-95.0 |  |
| 95 GHz | 95-100 | 5.000 |
| 105 GHz | 102-105 | 7.500 |
|  | 105-109.5 |  |
| 112 GHz | 111.8-114.25 | 2.450 |
| 122 GHz | 122.25-123 | 0.750 |
| 130 GHz | 130-134 | 4.000 |
| 140 GHz | 141-148.5 | 7.500 |

TABLE 1-continued

Examples of millimeter wave bands

| Bands [GHz] | Frequency [GHz] | Bandwidth [GHz] |
| --- | --- | --- |
| 150/160 GHz | 151.5-155.5 | 12.50 |
|  | 155.5-158.5 |  |
|  | 158.5-164 |  |

Figure 1:
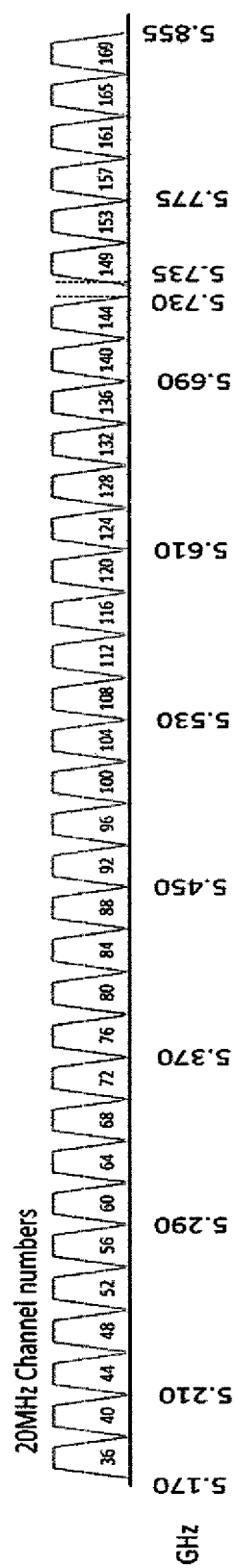
FIG. 1 illustrates 5 GHz license-exempt band which offers hundreds of megahertz (MHz) spectrum.

In the sub-6 GHz spectrum, two commonly used license-exempt frequency bands are the 2.4 GHz band and the 5 GHz band. FIG. 1 illustrates the 5 GHz license-exempt band which offers hundreds of megahertz (MHz) spectrum. The 5 GHz and the 2.4 GHz license-exempt bands are generally used by the local area network (LAN) standard called Wi-Fi.

Figure 2:
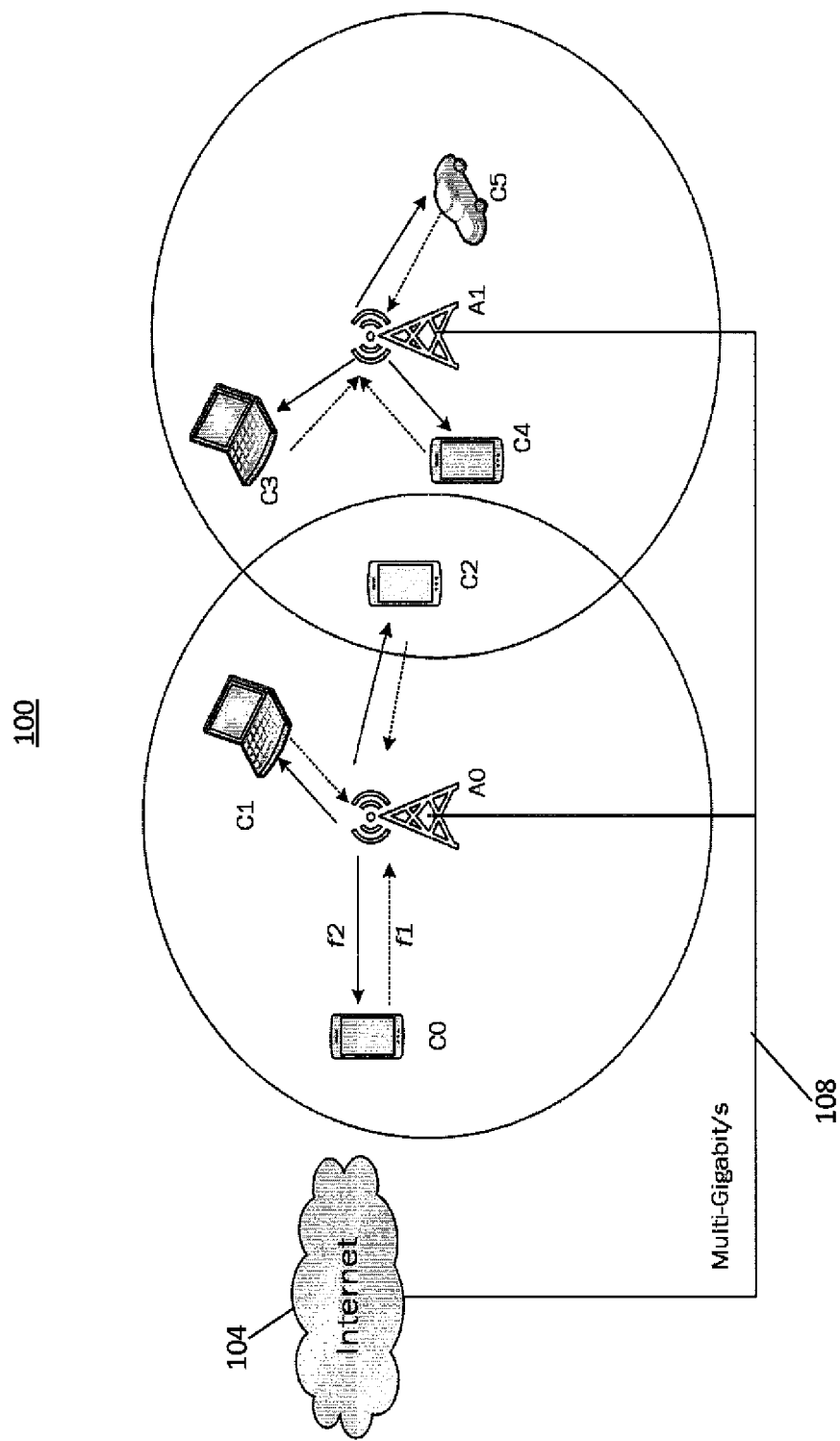
FIG. 2 illustrates an exemplary a wireless network in accordance with disclosed embodiments.

FIG. 2 illustrates an exemplary a wireless network 100 in accordance with disclosed embodiments. The wireless network 100 utilizes millimeter wave spectrum such as, for example, 28, 37 or 39 GHz bands in the downlink from base stations or access points A0 and A1 to communication devices C0-C5, and utilizes below 6 GHz spectrum bands, for example, in the uplink from communication devices C0-C5 to the base stations or access points A0 and A1. The access points A0 and A1 are connected to the Internet 104 using Gigabit's high-speed wired links such as, for example, an optical fiber link 108.

The wireless access point A0 provides services to communication devices C0, C1 and C2 on a first frequency $f_1$ on the uplink and a second frequency $f_2$ on the downlink. Similarly, access point A1 provides services to communication devices C3, C4 and C5 on a first frequency $f_1$ on the uplink and a second frequency $f_2$ on the downlink. Thus, the wireless network uses different spectrum in the transmit and receive directions to/from the access points.

According to disclosed embodiments, the widely-spaced downlink and uplink frequency spectrum bands are divided into spectrum blocks. By way of example, the downlink millimeter-wave frequency bands may be divided into spectrum blocks of length $B_2$ MHz. For example, the 27.5-28.35 GHz millimeter-wave frequency spectrum band may be divided into two blocks each of length $B_2$=425 MHz. The 37-38.6 GHz millimeter-wave frequency spectrum band may be divided into 8 blocks of $B_2$=200 MHz. The millimeter-wave frequency spectrum band 38.6-40 GHz may be divided into 7 blocks each equal to $B_2$=200 MHz. In the uplink sub-6 GHz, consider for example, a single block of length $B_1$ MHz is available.

According to disclosed embodiments, the downlink millimeter-wave frequency spectrum blocks are further divided into channels of bandwidth $C_{BW2}$ each. Likewise, the sub-6 GHz band is divided into channels of bandwidth $C_{BW1}$ each. In some implementations, the downlink and uplink channel bandwidths may be equal, and in other implementations the downlink and uplink channel bandwidths may be different. Thus, $C_{BW2}$ may equal $C_{BW1}$ or they may be different.

Figure 3:
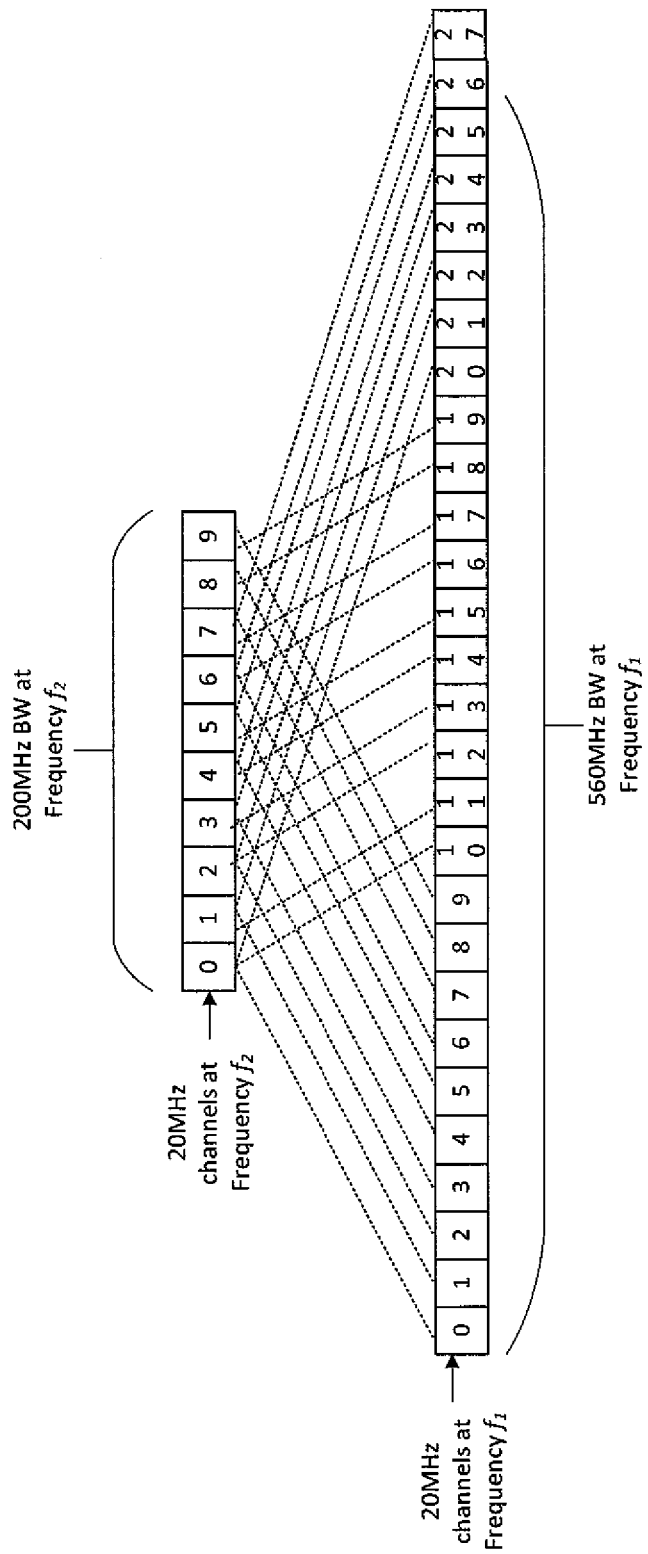
FIG. 3 illustrates an exemplary frequency mapping between a 200 MHz spectrum block in the downlink 38.6-40 GHz millimeter-wave frequency band and a 560 MHz spectrum block in the uplink sub-6 GHz frequency band.

FIG. 3 illustrates an exemplary frequency mapping between a 200 MHz spectrum block in the downlink 38.6-40 GHz millimeter-wave frequency band and a 560 MHz spectrum block in the uplink sub-6 GHz frequency band. It is assumed that the 200 MHz spectrum block in the 38.6-40 GHz millimeter-wave frequency band spans 39.2-39.4 GHz while 560 MHz of spectrum block in the sub-6 GHz band spans 5.17-5.73 GHz. The 200 MHz block $B_2$=200 MHz in the 39.2-39.4 GHz is divided into 10 channels of 20 MHz each $C_{BW2}$=20 MHz while the 560 MHz block in the 5.17-5.73 GHz is divided into 28 channels of 20 MHz each, $C_{BW1}$=20 MHz.

Since the spectrum block length of the downlink millimeter wave band is smaller than the spectrum block length of the uplink sub-6 GHz, in accordance with disclosed embodiments, each channel in the downlink millimeter wave spectrum is assigned to multiple users while each channel in the uplink sub-6 GHz spectrum is assigned only to one user and thus not shared. As illustrated in FIG. 3, downlink channel numbers 0-9 are first mapped to uplink channel numbers 0-9. Next, downlink channel numbers 0-9 are again mapped to uplink channel numbers 10-19. Finally, downlink channel numbers 0-7 are yet again mapped to uplink channel numbers 20-27. Since the bigger length block of uplink spectrum is divided into 28 channels while the smaller block length downlink spectrum is divided into 10 channels, the downlink channels 0-9 are assigned to multiple users so that all available uplink channels are efficiently utilized. The same downlink channel can be shared by more than one user by separating users in different spatial beams. These spatial beams may be created by using Multiple Input Multiple Output (MIMO) antenna arrays.

According to disclosed embodiments, the channel frequency mapping between the downlink millimeter wave channels and the uplink sub-6 GHz channels may be represented by the relationship described hereinafter. Consider, for example, the channel-center frequency for the kth channel in the millimeter-wave frequency spectrum block is denoted as $f_2^k$, where $$k = 0, 1, 2, \ldots, \left(\frac{B_2}{C_{BW2}} - 1\right)$$

and the channel-center frequency for the pth channel in the sub-6 GHz frequency band is denoted as $f_1^p$ where $$p = 0, 1, 2, \ldots, \left(\frac{B_1}{C_{BW1}} - 1\right).$$

For the case where the millimeter-wave frequency spectrum block is smaller than the sub-6 GHz frequency spectrum block, the center-frequency relationship between the kth channel in the millimeter-wave frequency spectrum block and the pth channel in the sub-6 GHz frequency band $f_2^p$ is given as:

$$f_2^{k=(p\ mod\ k)} = f_1^p + f_{LO}^p$$

Where $$K = \left(\frac{B_2}{C_{BW2}}\right), f_{LO}^p = f_{LO}^r - B_2 \times \left\lfloor \frac{p \times C_{BW2}}{B_2} \right\rfloor$$

and $f_{LO}^p$ is the Local-oscillator (LO2) frequency when frequency mapping from/to the pth channel in the licensed-exempt 5 GHz frequency is performed. $f_{LO}^r$ is reference or starting Local-oscillator (LO2) frequency.

Referring to FIG. 3, the first channel $C_0^2$ in the 39.2-39.4 GHz block is centered at 39.210 GHz while the first channel $C_0^1$ in the 5.17-5.73 GHz block is centered at 5.180 GHz. With these values, the reference or starting Local-oscillator (LO2) frequency $f_{LO}^r$ is determined as follows:

$$f_{LO}^r = 39.210 - 5.180 = 34.030 \text{ GHz}$$

According to disclosed embodiments, with the reference or starting local oscillator frequency known, a downlink millimeter wave channel and an uplink sub-6 GHz channel can be mapped to one another based on the aforementioned center-frequency relationship between the kth channel in the millimeter-wave frequency spectrum block and the pth channel in the sub-6 GHz frequency spectrum block band. By mapping a plurality of downlink millimeter wave channels to corresponding respective uplink sub-6 GHz channels, a channel frequency mapping table can be created.

Table 2 depicts channel frequency mapping between the sub-6 GHz frequency block and the 39 GHz millimeter wave frequency block in accordance with disclosed embodiments. As shown in Table 2, channels 0-9 in the sub-6 GHz license-exempt block channels 0-9 use the same Local-oscillator (LO2) frequency and are mapped to the 39 GHz millimeter wave frequency block channels 0-9.

For sub-6 GHz license-exempt block channels 10-19, the Local-oscillator (LO2) frequency is decremented by the block length of the 39 GHz millimeter wave frequency block of 200 MHz with $f_{LO}$=34.030−0.2000=33.830 GHz. Consequently, the 5 GHz license-exempt block channels 10-19 are mapped to the 39 GHz millimeter wave frequency block channels 0-9. For 5 GHz license-exempt block channels 20-27, the Local-oscillator (LO2) frequency is further decremented by the block length of the 39 GHz millimeter wave frequency block of 200 MHz with $f_{LO}$=34.030−0.4000=33,630 GHz. Thus, the 5 GHz license-exempt block channels 20-27 are mapped to the 39 GHz millimeter wave frequency block channels 0-7.

When the wireless access point A0 (shown in FIG. 2) provides services to communication devices C0, C1 and C2 on a first frequency $f_1$ using sub-6 GHz frequency on the uplink and a second 39 GHz millimeter wave frequency $f_2$ on the downlink, the communication devices can derive which channel to use on the uplink based on the received 39 GHz millimeter wave frequency channel. For example, when a communication device detects a beacon or other broadcast information on the 39 GHz millimeter wave frequency channel number 6 with center-frequency of 39.33 GHz, the communication device C0, by using the information in Table 2, determines that channel number 6 is mapped to the 5 GHz license-exempt channel number 16 with center-frequency of 5.5 GHz, which is also illustrated in FIG. 3. When communication device C0 sends a signal to the access point A0, the device C0 uses channel number 16 with center-frequency of 5.5 GHz. In other embodiments, access point A0 can explicitly communicate the channel mapping information in the beacon or other broadcast information. As shown in Table 2, the same channel in the downlink millimeter wave spectrum may be assigned to multiple users while the same channel in the uplink sub-6 GHz spectrum is not assigned to multiple users.

TABLE 2

Channel frequency mapping between the sub-6 GHz and 39 GHz millimeter wave frequency bands

| 5 GHz channel number p | 5 GHz channel center-frequency (GHz) $f_1^p$ | Local-oscillator (LO2) frequency (GHz) $f_{LO}^p$ | 39 GHz channel number k | 39 GHz channel center-frequency (GHz) $f_2^k$ |
|---|---|---|---|---|
| 0 | 5.18 | 34.03 | 0 | 39.21 |
| 1 | 5.2 | 34.03 | 1 | 39.23 |
| 2 | 5.22 | 34.03 | 2 | 39.25 |

TABLE 2-continued

Channel frequency mapping between the sub-6 GHz and 39 GHz millimeter wave frequency bands

| 5 GHz channel number p | 5 GHz channel center-frequency (GHz) $f_1^p$ | Local-oscillator (LO2) frequency (GHz) $f_{LO}^p$ | 39 GHz channel number k | 39 GHz channel center-frequency (GHz) $f_2^k$ |
|---|---|---|---|---|
| 3 | 5.24 | 34.03 | 3 | 39.27 |
| 4 | 5.26 | 34.03 | 4 | 39.29 |
| 5 | 5.28 | 34.03 | 5 | 39.31 |
| 6 | 5.3 | 34.03 | 6 | 39.33 |
| 7 | 5.32 | 34.03 | 7 | 39.35 |
| 8 | 5.34 | 34.03 | 8 | 39.37 |
| 9 | 5.36 | 34.03 | 9 | 39.39 |
| 10 | 5.38 | 33.83 | 0 | 39.21 |
| 11 | 5.4 | 33.83 | 1 | 39.23 |
| 12 | 5.42 | 33.83 | 2 | 39.25 |
| 13 | 5.44 | 33.83 | 3 | 39.27 |
| 14 | 5.46 | 33.83 | 4 | 39.29 |
| 15 | 5.48 | 33.83 | 5 | 39.31 |
| 16 | 5.5 | 33.83 | 6 | 39.33 |
| 17 | 5.52 | 33.83 | 7 | 39.35 |
| 18 | 5.54 | 33.83 | 8 | 39.37 |
| 19 | 5.56 | 33.83 | 9 | 39.39 |
| 20 | 5.58 | 33.63 | 0 | 39.21 |
| 21 | 5.6 | 33.63 | 1 | 39.23 |
| 22 | 5.62 | 33.63 | 2 | 39.25 |
| 23 | 5.64 | 33.63 | 3 | 39.27 |
| 24 | 5.66 | 33.63 | 4 | 39.29 |
| 25 | 5.68 | 33.63 | 5 | 39.31 |
| 26 | 5.7 | 33.63 | 6 | 39.33 |
| 27 | 5.72 | 33.63 | 7 | 39.35 |

Figure 4:
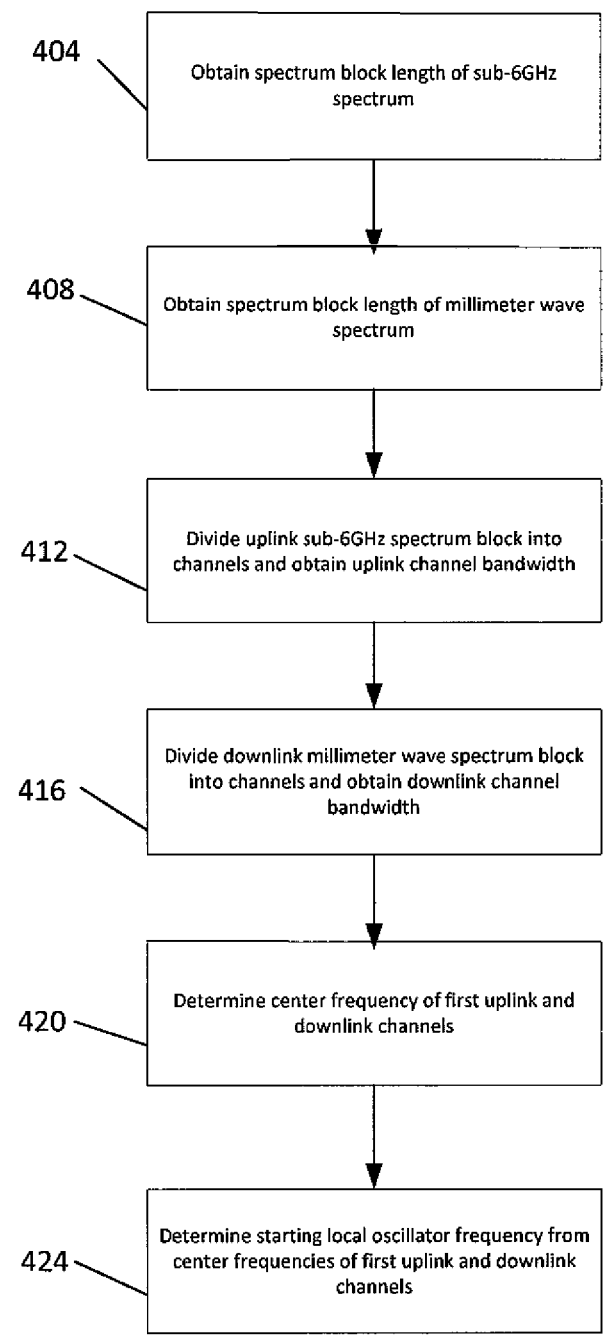
FIG. 4 is a flow diagram of a method for determining a starting local oscillator frequency in accordance with disclosed embodiments.

FIG. 4 is a flow diagram 400 of a method for determining a starting local oscillator frequency in accordance with disclosed embodiments. In step 404, a spectrum block length of the uplink sub-6 GHz spectrum is obtained. In step 408, a spectrum block length of the downlink millimeter wave spectrum is obtained. In step 412, the uplink sub-6 GHz spectrum block is divided into a plurality of uplink sub-6 GHz channels and the uplink channel bandwidth is determined. In step 416, the downlink millimeter wave spectrum block is divided into a plurality of downlink millimeter wave channels and the downlink channel bandwidth is determined. In step 420, center frequencies of the first channels of the downlink and uplink blocks are determined. In step 424, the starting local oscillator frequency is determined from the center frequencies of the first channels of the downlink and uplink channels.

Figure 5:
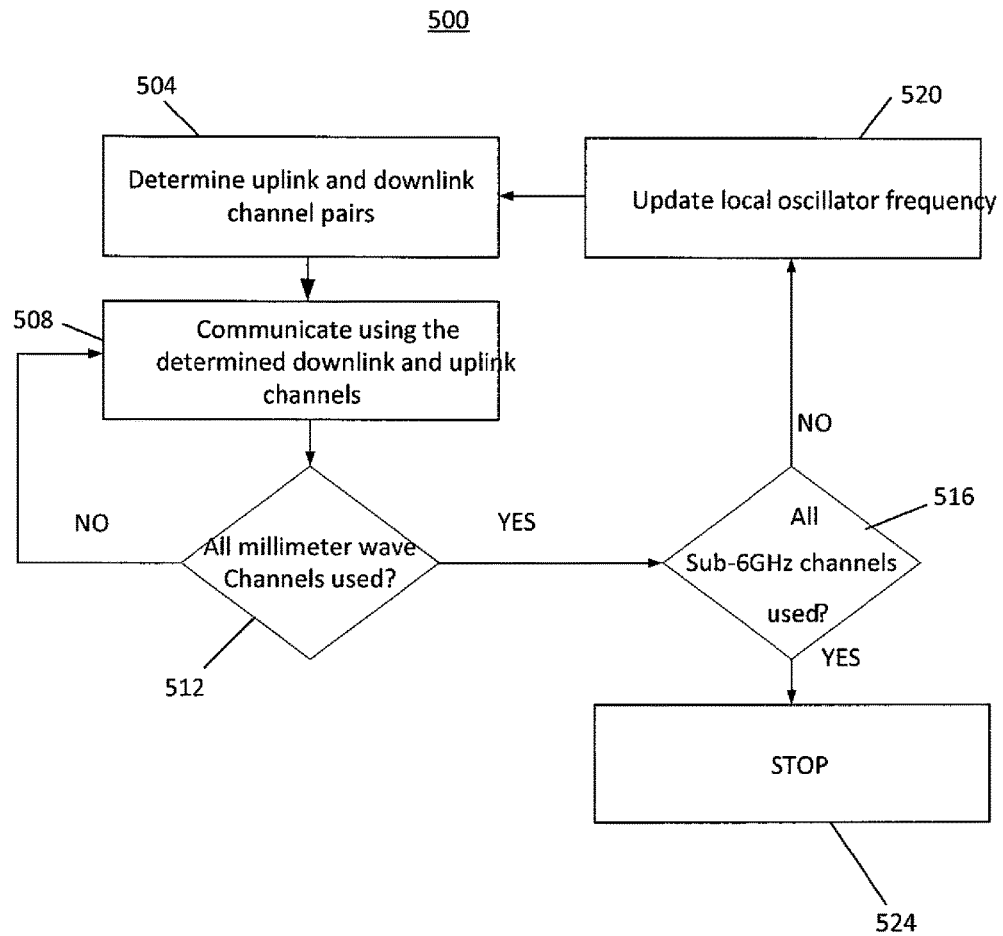
FIG. 5 is a flow diagram of channel assignments in accordance with disclosed embodiments.

FIG. 5 is a flow diagram 500 of channel assignments in accordance with disclosed embodiments. In step 504, uplink and downlink communication channel pairs are determined using the starting local oscillator frequency and the center frequencies of the first downlink and uplink channels. As described before and illustrated in FIG. 3, the frequency mapping scheme determines a plurality uplink and downlink channel pairs, wherein each uplink channel is mapped to a downlink channel and vice versa. As explained before, depending on the block length of the uplink and downlink spectrum and/or the number of channels in the uplink and downlink blocks, either each uplink or each downlink channel may be assigned to multiple users. Referring to FIG. 3, since the bigger length block of uplink spectrum is divided into 27 channels while the smaller block length downlink spectrum is divided into 9 channels, the downlink channels 0-9 are assigned to multiple users so that all available uplink channels are efficiently utilized.

In step 508, uplink and downlink channel pairs are assigned to users. In decision block 512, if all millimeter wave channels have not been used, the flow returns to step 508. If all millimeter wave channels have been used, the flow moves to decision block 516. In decision block 516, if all sub-6 GHz channels have not been used, the flow moves to step 520 where the local oscillator frequency is updated as described before, and the flow returns to step 504. If all sub-6 GHz channels have been used, the flow ends at step 524.

Figure 6:
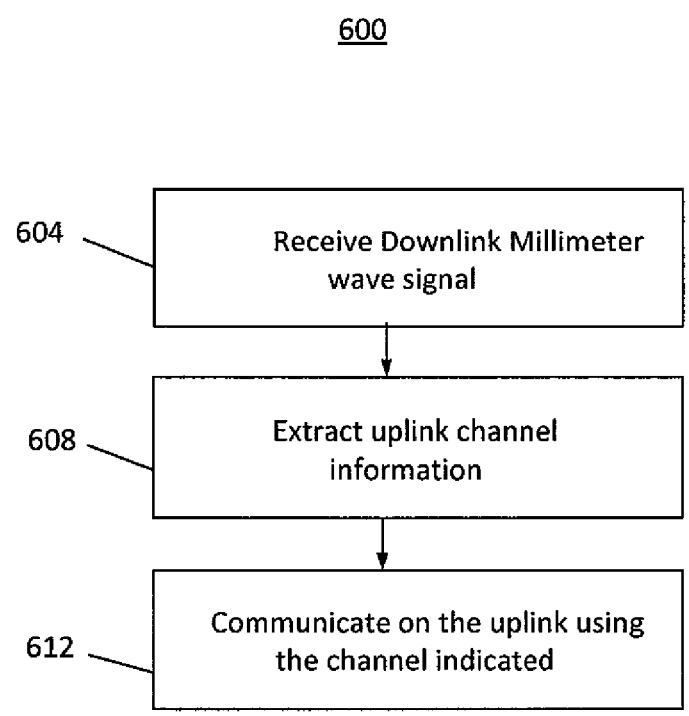
FIG. 6 is a flow diagram of a method of extracting the uplink channel information from a downlink millimeter wave transmission.

FIG. 6 is a flow diagram 600 of a method of extracting the uplink channel information from a downlink millimeter wave transmission. In step 604, a millimeter wave downlink signal is received by a communication device. The millimeter wave signal may be transmitted by a base station (e.g., A0 or A1 of FIG. 2) and received by a communication device (e.g., C0-C5 of FIG. 2). In step 608, uplink channel information is extracted by the communication device from the received millimeter wave signal. For example, the uplink channel information can be extracted from the frequency mapping table (Table 2). In step 612, the communication device uses the uplink channel to communicate with the base station.

For the case where the millimeter-wave frequency spectrum block is larger than the sub-6 GHz frequency band, the center-frequency relationship between the pth channel in the sub-6 GHz frequency band and the kth channel in the millimeter-wave frequency spectrum block and is given as:

$$f_1^{p=(k \bmod P)} = f_2^k - f_{LO}^k$$

Where $$P = \left(\frac{B_1}{C_{BW}}\right), f_{LO}^k = f_{LO}^r + B_1 \times \left\lfloor \frac{k \times C_{BW}}{B_1} \right\rfloor$$

and $f_{LO}^k$ is the Local-oscillator (LO2) frequency when frequency mapping from/to the kth channel in the millimeter-wave frequency spectrum is performed. $f_{LO}^r$ is reference or starting Local-oscillator (LO2) frequency.

Figure 7:
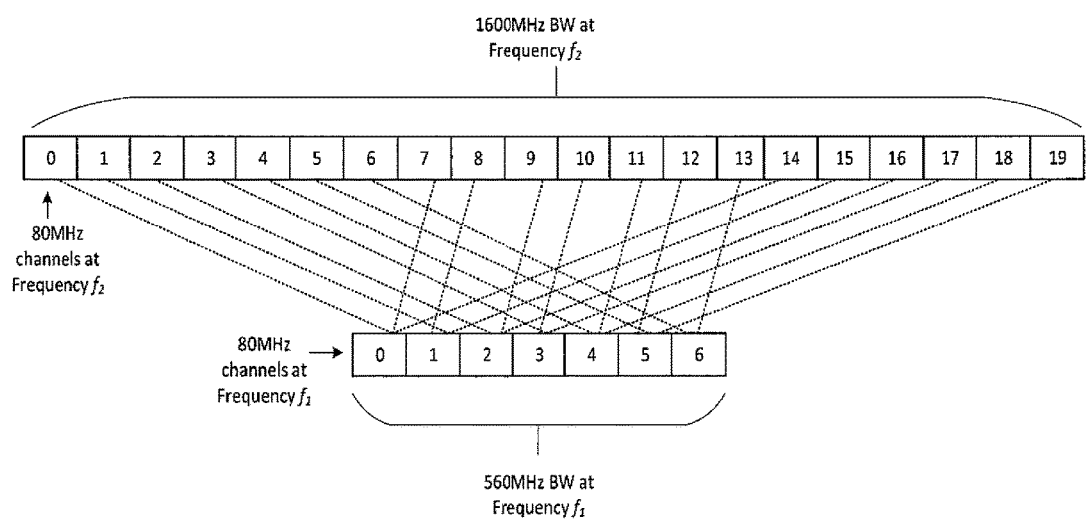
FIG. 7 illustrates an example of frequency mapping between 1600 MHz spectrum block in the licensed 37 GHz millimeter-wave frequency band and 560 MHz of spectrum block in the sub-6 GHz band.

FIG. 7 illustrates an example of frequency mapping between 1600 MHz spectrum block in the licensed 37 GHz millimeter-wave frequency band and 560 MHz of spectrum block in the sub-6 GHz band. We further assume that the 1600 MHz spectrum block in the licensed 37 GHz millimeter-wave frequency band spans 37-39.6 GHz while 560 MHz of spectrum block in the sub-6 GHz band spans 5.17-5.73 GHz. The 1600 MHz block $B_2$=1600 MHz in the 37-39.6 GHz is divided into 20 channels of 80 MHz each $C_{BW2}$=80 MHz while 5.17-5.73 GHz block is divided into 7 channels of 80 MHz each, $C_{BW1}$=80 MHz.

The first channel C0 in the 37-39.6 GHz block is centered at 37.040 GHz while the first channel C1; in the 5.17-5.73 GHz block is centered at 5.210 GHz. With these values, the reference or starting Local-oscillator (LO2) frequency $f_{LO}^r$ is determined as $f_{LO}^r$=37.040−5.210=31.830 GHz. The detailed channel frequency mapping between the 37 GHz millimeter wave frequency block and 5 GHz block is depicted in Table 3. From this Table, it is noted that the 37 GHz millimeter wave frequency block channels 0-6 use the same Local-oscillator (LO2) frequency and are mapped to the 5 GHz block channels 0-6.

For 37 GHz millimeter wave frequency block channels 7-13, the Local-oscillator (LO2) frequency is incremented by the block length of 5 GHz license-exempt frequency block of 560 MHz with $f_{LO}$, =31.830+0.560=32.390 GHz. Thus, the 37 GHz millimeter wave frequency block channels 7-13 are mapped to the 5 GHz frequency block channels 0-6. For 37 GHz millimeter wave frequency block channels 14-19, the Local-oscillator (LO2) frequency is incremented by the block length of 5 GHz license-exempt frequency block of 560 MHz with $f_{LO}$=31.830+1.120=32.950 GHz. Thus the 37 GHz millimeter wave frequency block channels 14-19 are mapped to the 5 GHz frequency block channels 0-5.

When the wireless access point A0 illustrated in FIG. 2 provides services to communication devices C0, C1 and C2 on a first frequency $f_1$ using sub-6 GHz on the uplink and a second 37 GHz millimeter wave frequency $f_2$ on the downlink, the communication devices can derive which channel to use on the uplink based on the explicit channel information received in the 37 GHz millimeter wave frequency channel on the downlink. The explicit channel indication in the downlink is desirable because more than one channels in the 37 GHz millimeter wave frequency block map to the same channel in the sub-6 GHz frequency block. The channel mapping information can be transmitted in beacons or another broadcast channel on the downlink.

For example, when a communication device detects a beacon or other broadcast information on the 37 GHz millimeter wave frequency channel number 14 with center-frequency of 38.16 GHz, the communication device C0, using the information in Table 3, determines that the downlink channel is mapped to the 5 GHz channel number 0 with center-frequency of 5.21 GHz, which is also illustrated in FIG. 7. When communication device C0 sends a signal to the access point A0, C0 transmits on channel number 0 with center-frequency of 5.21 GHz.

TABLE 3

Channel frequency mapping between the 37 GHz millimeter wave frequency and 5 GHz bands

| 37 GHz channel number k | 37 GHz channel center-frequency (GHz) $f_2^k$ | Local-oscillator (LO2) frequency (GHz) $f_{LO}^p$ | 5 GHz channel number p | 5 GHz channel center-frequency (GHz) $f_1^p$ |
|---|---|---|---|---|
| 0 | 37.04 | 31.83 | 0 | 5.21 |
| 1 | 37.12 | 31.83 | 1 | 5.29 |
| 2 | 37.20 | 31.83 | 2 | 5.37 |
| 3 | 37.28 | 31.83 | 3 | 5.45 |
| 4 | 37.36 | 31.83 | 4 | 5.53 |
| 5 | 37.44 | 31.83 | 5 | 5.61 |
| 6 | 37.52 | 31.83 | 6 | 5.69 |
| 7 | 37.60 | 32.39 | 0 | 5.21 |
| 8 | 37.68 | 32.39 | 1 | 5.29 |
| 9 | 37.76 | 32.39 | 2 | 5.37 |
| 10 | 37.84 | 32.39 | 3 | 5.45 |
| 11 | 37.92 | 32.39 | 4 | 5.53 |
| 12 | 38.00 | 32.39 | 5 | 5.61 |
| 13 | 38.08 | 32.39 | 6 | 5.69 |
| 14 | 38.16 | 32.95 | 0 | 5.21 |
| 15 | 38.24 | 32.95 | 1 | 5.29 |
| 16 | 38.32 | 32.95 | 2 | 5.37 |
| 17 | 38.40 | 32.95 | 3 | 5.45 |
| 18 | 38.48 | 32.95 | 4 | 5.53 |
| 19 | 38.56 | 32.95 | 5 | 5.61 |

Figure 8:
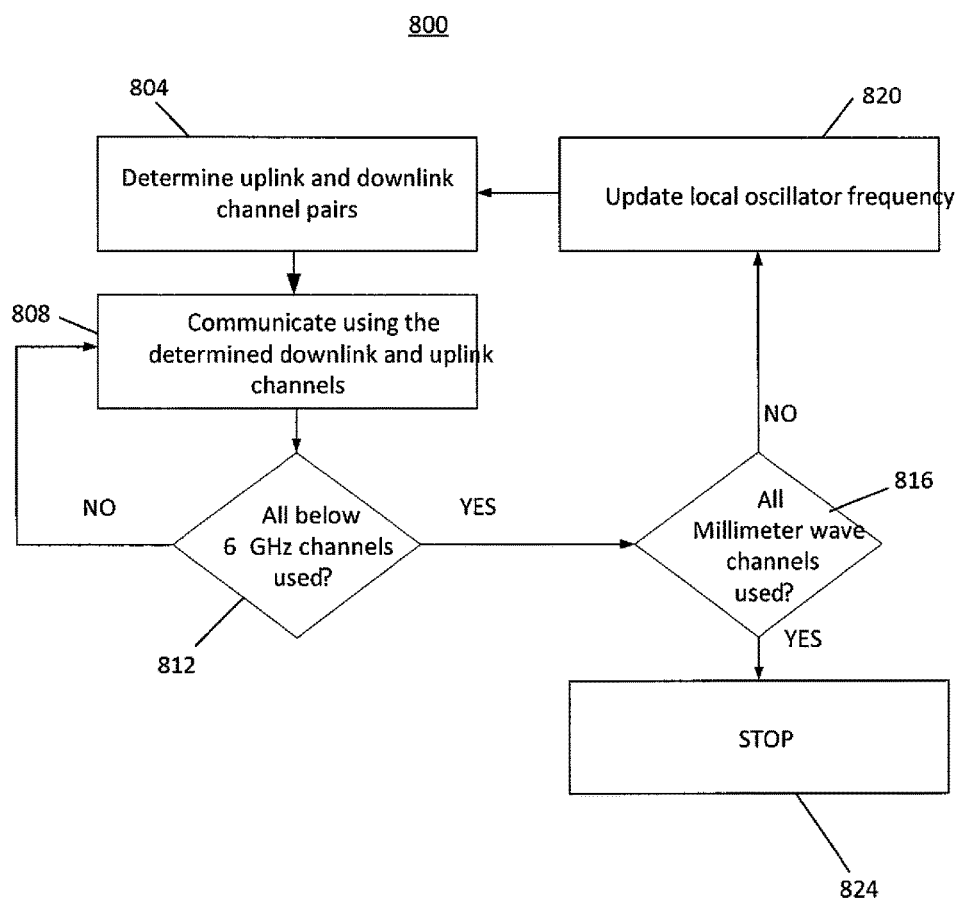
FIG. 8 is a flow diagram 800 of channel assignments in accordance with disclosed embodiments.

FIG. 8 is a flow diagram 800 of channel assignments in accordance with disclosed embodiments. In step 804, uplink and downlink communication channel pairs are determined using the starting local oscillator frequency and the center frequencies of the first downlink and uplink channels. As described before and illustrated in FIG. 7, the frequency mapping scheme determines a plurality uplink and downlink channel pairs, wherein each uplink channel is mapped to a downlink channel and vice versa. As explained before, depending on the block length of the uplink and downlink spectrum and/or the number of channels in the uplink and downlink blocks, either each uplink or each downlink channel may be assigned to multiple users. Referring to FIG. 7, since the bigger length block of downlink spectrum is divided into 20 channels while the smaller block length uplink spectrum is divided into 7 channels, the uplink channels 0-7 are assigned to multiple users so that all available downlink channels are efficiently utilized.

In step 808, uplink and downlink channel pairs are assigned to users. In decision block 812, if all sub-6 GHz channels have not been used, the flow returns to step 808. If all sub-6 GHz channels have been used, the flow moves to decision block 816. In decision block 816, if all millimeter wave channels have not been used, the flow moves to step 820 where the local oscillator frequency is updated as described before, and the flow returns to step 804. If all millimeter wave channels have been used, the flow ends at step 824.

In other embodiments, the channel bandwidth used by the access point or base station on the downlink can be different than the channel bandwidth used by communication devices on the uplink. For example, the access point may use bandwidth expansion where different set of antennas uses different frequency channels.

Figure 9:
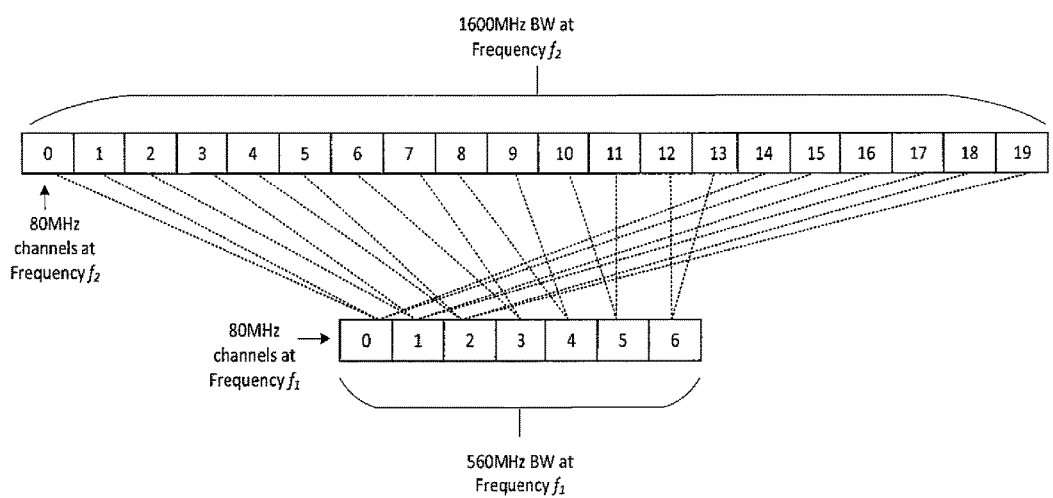
FIG. 9 illustrates an example of frequency mapping between 1600 MHz spectrum block using bandwidth expansion in the 37 GHz millimeter-wave frequency band and 560 MHz of spectrum block in the 5 GHz band.

FIG. 9 illustrates an example of frequency mapping between 1600 MHz spectrum block using bandwidth expansion in the 37 GHz millimeter-wave frequency band and 560 MHz of spectrum block in the 5 GHz band. The 1600 MHz spectrum block in the 37 GHz millimeter-wave frequency band spans 37-39.6 GHz while 560 MHz of spectrum block in the 5 GHz band spans 5.17-5.73 GHz. The 1600 MHz block $B_2$=1600 MHz in the 37-39.6 GHz is divided into 20 channels of 80 MHz each $C_{BW}$=80 MHz while 5.17-5.73 GHz block is divided into 7 channels of 80 MHz each, $C_{BW}$=80 MHz.

The first channel $C_0^2$ in the 37-39.6 GHz block is centered at 37.040 GHz while the first channel $C_0^1$ in the 5.17-5.73 GHz block is centered at 5.210 GHz. With these values, we determine the reference or starting Local-oscillator (LO2) frequency $f_{LO}^r$ as $f_{LO}^r$=37.040−5.210=31.830 GHz. The detailed channel frequency mapping between the 37 GHz millimeter wave frequency block using bandwidth expansion and 5 GHz license-exempt block is depicted in Table 4. From this Table, we note that the 37 GHz millimeter wave frequency block channels 0-6 use the same Local-oscillator (LO2) frequency of 31.83 GHz and a pair of these channels is mapped to a single 5 GHz license-exempt block channel. 37 GHz millimeter wave frequency block channels 7-13 also use the same Local-oscillator (LO2) frequency of 32.39 GHz and finally 37 GHz millimeter wave frequency block channels 14-19 use the same Local-oscillator (LO2) frequency of 32.95 GHz.

The 37 GHz millimeter wave frequency block channels 0 and 1 are mapped to the 5 GHz license-exempt block channel 0, 37 GHz millimeter wave frequency block channels 2 and 3 are mapped to the 5 GHz license-exempt block channel 1, 37 GHz millimeter wave frequency block channels 4 and 5 are mapped to the 5 GHz license-exempt block channel 2, 37 GHz millimeter wave frequency block channels 6 and 7 are mapped to the 5 GHz license-exempt block channel 3 and so on. Two different Local-oscillator (LO2) frequencies are used for a pair of two 37 GHz millimeter wave frequency block channels in order to map them to the same 5 GHz license-exempt block channel. For example, 37 GHz millimeter wave frequency block channels 0 and 1 use Local-oscillator (LO2) frequencies of 31.83 GHz and 31.91 GHz respectively with 80 MHz frequency separation.

When the wireless access point A0 of FIG. 2 provides services to communication devices C0, C1 and C2 on a first frequency $f_1$ using 5 GHz band on the uplink and a second 37 GHz millimeter wave frequency $f_2$ on the downlink, the communication devices can derive which channel to use on the uplink based on the explicit channel information received in the 37 GHz millimeter wave frequency channel on the downlink. For example, when a communication device receives beacon or other broadcast information on 37 GHz millimeter wave frequency channel 8 or channel 9 or both, it determines that the uplink channel linked is channel number 4 with center frequency of 5.53 GHz.

The access point uses center frequencies of 37.68 GHz and 37.76 GHz which are separated by 80 MHz for the 37 GHz millimeter wave frequency channel 8 or channel 9 respectively. The access point uses Local-oscillator (LO2) frequencies of 32.15 GHz and 32.23 GHz which are also separated by 80 MHz. When a communication device receives transmissions from the access point on 37 GHz millimeter wave frequency channel 8 or channel 9 at center frequencies of 37.68 GHz and 37.76 GHz, it uses Local-oscillator (LO2) frequencies of 32.15 GHz and 32.23 GHz to down-covert these frequencies to the same 5.53 Ghz frequency of 5 GHz license-exempt block channel number 4.

TABLE 4

Channel frequency mapping between the 37 GHz millimeter wave frequency band using bandwidth expansion and 5 GHz license-exempt band

| 37 GHz channel number k | 37 GHz channel center-frequency (GHz) $f_2^k$ | Local-oscillator (LO2) frequency (GHz) $f_{LO}^p$ | 5 GHz channel number p | 5 GHz channel center-frequency (GHz) $f_1^p$ |
|---|---|---|---|---|
| 0 | 37.04 | 31.83 | 0 | 5.21 |
| 1 | 37.12 | 31.91 | 0 | 5.21 |
| 2 | 37.20 | 31.91 | 1 | 5.29 |
| 3 | 37.28 | 31.99 | 1 | 5.29 |
| 4 | 37.36 | 31.99 | 2 | 5.37 |
| 5 | 37.44 | 32.07 | 2 | 5.37 |
| 6 | 37.52 | 32.07 | 3 | 5.45 |
| 7 | 37.60 | 32.15 | 3 | 5.45 |
| 8 | 37.68 | 32.15 | 4 | 5.53 |
| 9 | 37.76 | 32.23 | 4 | 5.53 |
| 10 | 37.84 | 32.23 | 5 | 5.61 |
| 11 | 37.92 | 32.31 | 5 | 5.61 |
| 12 | 38.00 | 32.31 | 6 | 5.69 |
| 13 | 38.08 | 32.39 | 6 | 5.69 |
| 14 | 38.16 | 32.95 | 0 | 5.21 |
| 15 | 38.24 | 33.03 | 0 | 5.21 |
| 16 | 38.32 | 33.03 | 1 | 5.29 |
| 17 | 38.40 | 33.11 | 1 | 5.29 |
| 18 | 38.48 | 33.11 | 2 | 5.37 |
| 19 | 38.56 | 33.19 | 2 | 5.37 |

Figure 10:
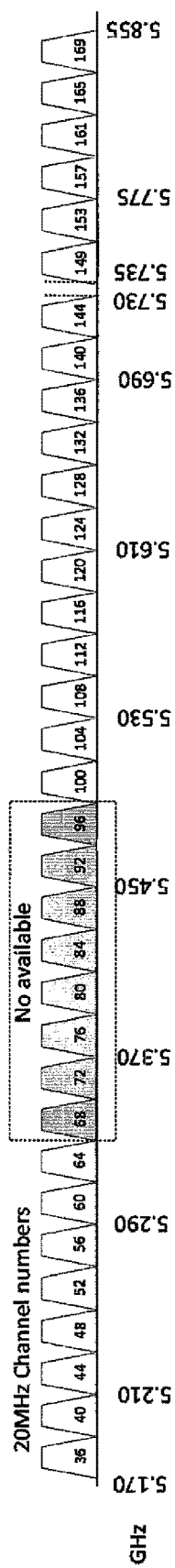
FIG. 10 shows eight 20 MHz channels 68, 72, 76, 80, 84, 88, 92 and 96 spanning total of 160 MHz in the 5 GHz band are not available for use.

In some cases, there may be gaps in the spectrum block as some of the channels in the spectrum block may not be available for use. For example, FIG. 10 shows that eight 20 MHz channels 68, 72, 76, 80, 84, 88, 92 and 96 spanning total of 160 MHz in the license-exempt 5 GHz band are not available for use. These channels correspond to 80 MHz channel numbers 2 and 3 in an example frequency mapping between 1600 MHz spectrum block in the 37 GHz millimeter band.

Figure 11:
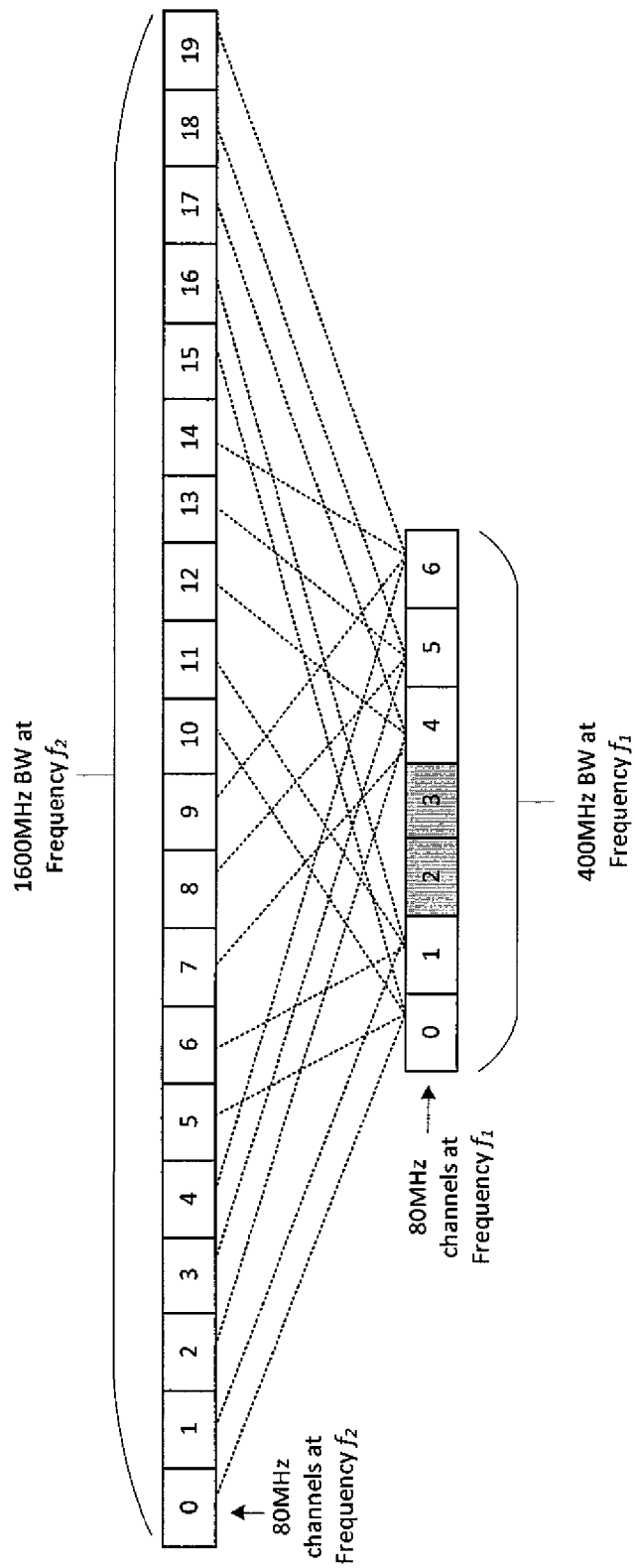
FIG. 11 illustrates an example of frequency mapping between 1600 MHz spectrum block in the 37 GHz millimeter-wave frequency band and 400 MHz of spectrum block in the 5 GHz band where 160 MHz spectrum correspond to 80 MHz channel numbers 2 and 3 not available for use.

FIG. 11 illustrates an example of frequency mapping between 1600 MHz spectrum block in the 37 GHz millimeter-wave frequency band and 400 MHz of spectrum block in the 5 GHz band where 160 MHz spectrum correspond to 80 MHz channel numbers 2 and 3 are not available for use. The 1600 MHz spectrum block in the 37 GHz millimeter-wave frequency band spans 37-39.6 GHz while 400 MHz of spectrum block in the 5 GHz band spans 5.17-5.73 GHz with a 160 MHz gap from 5.33 to 5.49 GHz. The 1600 MHz block $B_2$=1600 MHz in the 37-39.6 GHz is divided into 20 channels of 80 MHz each $C_{BW}$=80 MHz while 5.17-5.73 GHz block is divided into 7 channels of 80 MHz each, $C_{BW}$=80 MHz where 80 MHz channel numbers 2 and 3 are not available for use.

Figure 12:
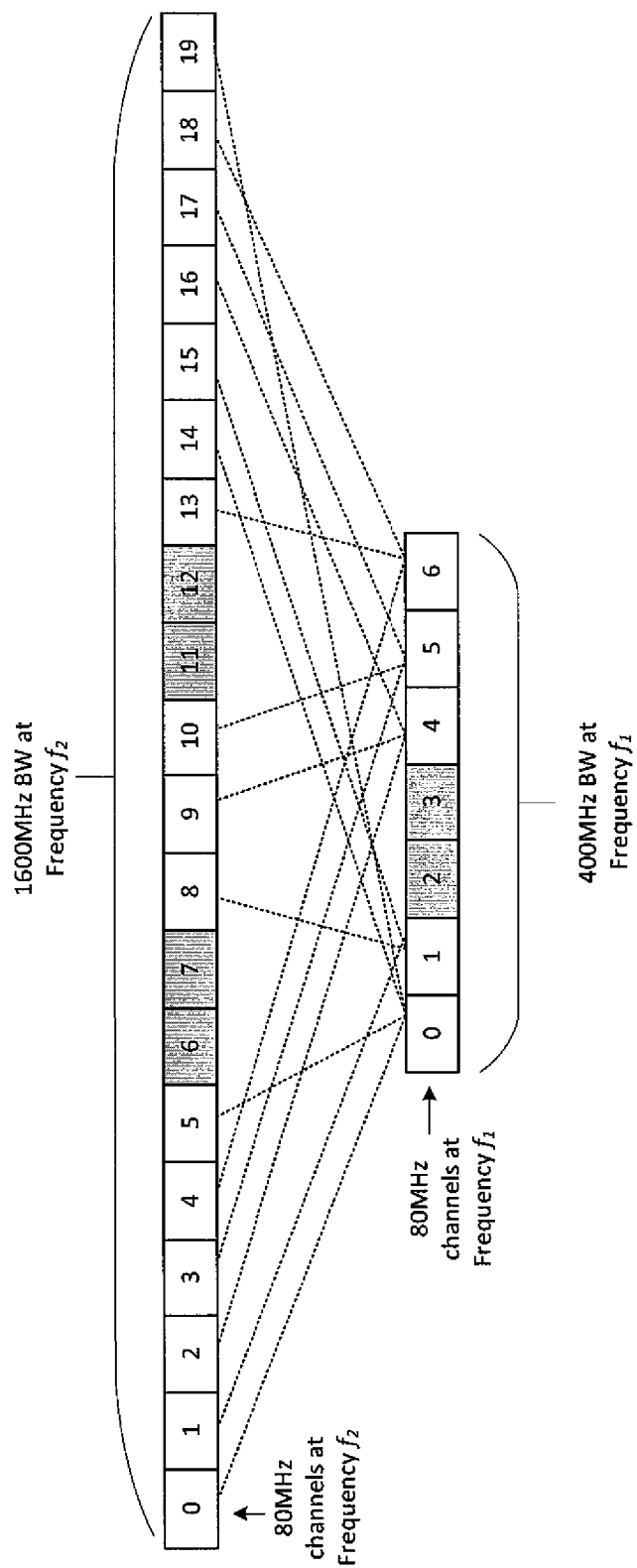
FIG. 12 illustrates an example of frequency mapping between 1280 MHz spectrum block in the 37 GHz millimeter-wave frequency band and 400 MHz of spectrum block in the 5 GHz band.

FIG. 12 illustrates an example of frequency mapping between 1280 MHz spectrum block in the 37 GHz millimeter-wave frequency band and 400 MHz of spectrum block in the 5 GHz band. We assume that 320 MHz of spectrum consisting of 80 MHz channel numbers 6, 7, 11 and 12 is not available in the 37 GHz millimeter-wave frequency band whereas 160 MHz spectrum corresponding to 80 MHz channel numbers 2 and 3 are not available for use in the 5 GHz band. We further assume that the 1600 MHz spectrum block in the 37 GHz millimeter-wave frequency band spans 37-39.6 GHz with two gaps of 160 MHz while 400 MHz of spectrum block in the 5 GHz band spans 5.17-5.73 GHz with a 160 MHz gap from 5.33 to 5.49 GHz. The 1600 MHz block $B_2$=1600 MHz in the 37-39.6 GHz is divided into 20 channels of 80 MHz each $C_{BW}$=80 MHz where 80 MHz channel numbers 6, 7, 11 and 12 are not available for use while 5.17-5.73 GHz block is divided into 7 channels of 80 MHz each, $C_{BW}$=80 MHz where 80 MHz channel numbers 2 and 3 are not available for use.

Those skilled in the art will recognize that, for simplicity and clarity, the full structure and operation of all systems suitable for use with the present disclosure is not being depicted or described herein. Instead, only so much of a system as is unique to the present disclosure or necessary for an understanding of the present disclosure is depicted and described. The remainder of the construction and operation of the disclosed systems may conform to any of the various current implementations and practices known in the art.

Of course, those of skill in the art will recognize that, unless specifically indicated or required by the sequence of operations, certain steps in the processes described above may be omitted, performed concurrently or sequentially, or performed in a different order. Further, no component, element, or process should be considered essential to any specific claimed embodiment, and each of the components, elements, or processes can be combined in still other embodiments.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

The invention claimed is:
1. A method of determining a starting local oscillator frequency for downlink and uplink frequency channel assignments in a wireless communications system utilizing widely-spaced downlink and uplink frequency channels, the method comprising:
    generating downlink spectrum blocks by dividing a millimeter wave spectrum;
    generating uplink spectrum blocks by dividing a sub-6 GHz spectrum;
    dividing the downlink spectrum blocks into a plurality of downlink channels having a downlink channel bandwidth;
    dividing the uplink spectrum blocks into a plurality of uplink channels having an uplink channel bandwidth;
    determining a center frequency of a first uplink channel, wherein the first uplink channel has the lowest center frequency of the plurality of uplink channels;
    determining a center frequency of a first downlink channel, wherein the first downlink channel has the lowest center frequency of the plurality of downlink channels;
    determining a starting local oscillator frequency from the center frequency of the first uplink channel, the center frequency of the first downlink channel and the uplink channel bandwidth and the downlink channel bandwidths; and
    determining a first group of uplink and downlink communications channel pairs based on a frequency mapping relationship based on the starting oscillator frequency.

2. The method of claim 1, wherein there are m channels at each of the uplink spectrum blocks and n channels at each of the downlink spectrum blocks, wherein m and n are integers.

3. The method of claim 2, wherein m>n.

4. The method of claim 1, further comprising:
    decrementing the starting local oscillator frequency; and
    determining a second group of uplink and downlink communications channel pairs based on a frequency mapping relationship based on the decremented local oscillator frequency.

5. The method of claim 4, wherein the starting local oscillator frequency is decremented based on the uplink and downlink spectrum blocks.

6. The method of claim 4, wherein the starting local oscillator frequency is decremented based on a length of a uplink spectrum block of the uplink spectrum blocks, wherein a downlink spectrum block of the downlink spectrum blocks is greater than the uplink spectrum block.

7. The method of claim 4, wherein the starting local oscillator frequency is decremented based on a length of a downlink spectrum block of the downlink spectrum blocks, wherein a uplink spectrum block of the uplink spectrum blocks is greater than the downlink spectrum block.

8. A method of channel assignments in a wireless communications system utilizing widely-spaced downlink and uplink frequency channels, the method comprising:
    generating downlink spectrum blocks by dividing a millimeter wave spectrum;
    generating uplink spectrum blocks by dividing a sub-6 GHz spectrum;
    dividing the downlink spectrum blocks into a plurality of downlink channels having a downlink channel bandwidth;
    dividing the uplink spectrum blocks into a plurality of uplink channels having an uplink channel bandwidth;
    determining a center frequency of a first uplink channel, wherein the first uplink channel has the lowest center frequency of the plurality of uplink channels;
    determining a center frequency of a first downlink channel, wherein the first downlink channel has the lowest center frequency of the plurality of downlink channels;
    determining a starting oscillator frequency from the center frequency of the first uplink channel, the center frequency of the first downlink channel and the uplink channel bandwidth and the downlink channel bandwidth;
    determining a first group of uplink and downlink communications channel pairs based on a frequency mapping relationship based on the starting oscillator frequency; and
    assigning a first uplink and downlink communications channel pair to a user.

9. The method of claim 8, wherein the downlink channel is in a millimeter wave band and the uplink channel is in a sub-6 GHz channel.

10. The method of claim 8, further comprising:
    determining if all millimeter wave channels have been used;
    if all millimeter wave channels have not been used, assigning a second uplink and downlink communications channel pair to a user;
    if all millimeter wave channels have been used, determining if all sub-6 GHz channels have been used;
    updating the local oscillator frequency if all sub-6 GHz channels have been used; and
    determining a plurality of uplink and downlink communications channel pairs based on the frequency mapping relationship based on the updated starting local oscillator frequency.

11. The method of claim 10, wherein each millimeter wave channel is assigned to a plurality of users.

12. The method of claim 10, wherein the sub-6 GHz channels are each assigned to a respective user.

13. The method of claim 8, further comprising communicating at the assigned uplink and downlink communications channel pair.

14. The method of claim 8, further comprising:
    determining if all sub-6 GHz channels have been used;
    if all sub-6 GHz channels have not been used, assigning a second uplink and downlink communications channel pair to a user;
    if all sub-6 GHz channels have been used, determining if all millimeter wave channels have been used;
    updating the local oscillator frequency if all 6 GHz channels have been used; and
    determining a plurality of uplink and downlink communications channel pairs based on the frequency mapping relationship based on the updated starting local oscillator frequency.

15. The method of claim 14, further comprising communicating at the assigned uplink and downlink communications channel pair.

16. The method of claim 15, wherein each sub-GHz channel is assigned to a plurality of users.

17. The method of claim 15, wherein the millimeter wave channels are each assigned to a respective user.

18. The method of claim 8, further comprising:
    decrementing the starting local oscillator frequency; and
    determining a second group of uplink and downlink communications channel pairs based on a frequency mapping relationship based on the decremented local oscillator frequency.

19. The method of claim 18, wherein the starting local oscillator frequency is decremented based on the uplink and downlink spectrum blocks.

20. The method of claim 18, wherein the starting local oscillator frequency is decremented based on a length of a uplink spectrum block of the uplink spectrum blocks, wherein a downlink spectrum block of the downlink spectrum blocks is greater than the uplink spectrum block.

21. The method of claim 18, wherein the starting local oscillator frequency is decremented based on a length of a downlink spectrum block of the downlink spectrum blocks, wherein a uplink spectrum block of the uplink spectrum blocks is greater than the downlink spectrum block.

\* \* \* \* \*